United States Patent
Zhu

(12) 
(10) Patent No.: US 7,142,223 B2
(45) Date of Patent: Nov. 28, 2006

(54) MIXED 2D AND 3D DE-INTERLACER

(75) Inventor: Ge Zhu, Shanghai (CN)

(73) Assignee: Huaya Microelectronics, Ltd., San Jose, CA (US)

( * ) Notice: Subject to any disclaimer, the term of this patent is extended or adjusted under 35 U.S.C. 154(b) by 239 days.

(21) Appl. No.: 10/659,772

(22) Filed: Sep. 9, 2003

(65) Prior Publication Data

US 2004/0207633 A1 Oct. 21, 2004

(30) Foreign Application Priority Data

Apr. 16, 2003 (CN) .............................. 03 1 16417

(51) Int. Cl.
 *G09G 5/00* (2006.01)

(52) U.S. Cl. ............... 345/606; 345/426; 345/428; 345/592; 345/643; 345/673; 345/691; 345/692; 345/694; 348/445; 348/446; 348/447; 348/448; 386/109; 386/110; 386/111

(58) Field of Classification Search ............ 345/426, 345/428, 589, 592, 643, 606, 673, 691, 692; 348/445–448; 386/109–111
See application file for complete search history.

(56) References Cited

U.S. PATENT DOCUMENTS

| | | | | |
|---|---|---|---|---|
| 5,708,474 A | * | 1/1998 | Hong | 348/448 |
| 6,343,100 B1 | * | 1/2002 | Fujiwara et al. | 375/240.17 |
| 6,507,346 B1 | * | 1/2003 | Otera | 345/606 |
| 6,686,923 B1 | * | 2/2004 | Ji et al. | 345/606 |

* cited by examiner

*Primary Examiner*—Matthew C. Bella
*Assistant Examiner*—Antonio Caschera
(74) *Attorney, Agent, or Firm*—Silicon Valley Patent Group; Edward S. Mao

(57) ABSTRACT

A de-interlacing methodology generates frames from interlaced video signals by incorporating data from multiple fields into an interpolation-based de-interlacing process. Pixels directly above and below a blank pixel location and pixels immediately before and after the blank pixel location (in the fields immediately preceding and following, respectively, the blank pixel field) can be used to interpolate a pixel value for the blank pixel location. The use of pixel data from multiple fields improves the resolution of the interpolation process, thereby improving output frame accuracy. Adjacent pixel values can also be adjusted to further improve the consistency of the visual display provided by the output frames.

9 Claims, 8 Drawing Sheets

MIXED 2D AND 3D DE-INTERLACER

BACKGROUND OF THE INVENTION

1. Field of the Invention

The present invention relates to digital graphics systems. More specifically, the present invention relates to methods and circuits for accurately de-interlacing a video signal.

2. Discussion of Related Art

Modern video signals typically consist of a sequence of still images, or "frames." By displaying the sequence of frames in rapid succession on a display unit such as a computer monitor or television, an illusion of full motion video can be produced. For example, a standard NTSC (National Television Systems Committee) television display has a frame rate of 29.970 fps (frames per second). For historical reasons, the frames in video displays for most consumer applications (and many professional applications) are formed from "interlaced" video signals in which the video signals are made up of "fields" that include half the data required for a full frame. Specifically, each field includes every other row of pixels that would be included in a complete frame, with one field (the "odd field") including all the odd rows of the frame, and the other field (the "even field") including all of the even rows.

FIG. 1 depicts this interlacing concept, as a view 110 is interlaced into an odd field 120 and an even field 130. Odd field 120 includes odd rows SO(1), SO(2), SO(3), SO(4), SO(5), SO(6), SO(7), and SO(8), which represent rows 1, 3, 5, 7, 9, 11, 13, and 15, respectively, of view 110. Even field 130 includes even rows SE(1), SE(2), SE(3), SE(4), SE(5), SE(6), SE(7), and SE(8), which represent rows 2, 4, 6, 8, 10, 12, 14, and 16, respectively, of view 110. Note that each of odd rows SO(1)–SO(8) in field 120 corresponds to a blank row (i.e., a row with no pixel values) in field 130, while each of even rows SE(1)–SE(8) in field 130 corresponds to a blank row in field 120.

View 110 depicts a white square 111 formed in a shaded background 112. Therefore, odd rows SO(1)–SO(8) are all shaded, except for a white portion 121 in each of odd rows SO(4), SO(5), and SO(6) corresponding to the portion of those rows corresponding to white square 111. Similarly, even rows SE(1)–SE(8) are all shaded, except for a white portion 131 in each of even rows SE(3), SE(4), and SE(5), corresponding to the portion of those rows corresponding to white square 111.

Note that color video signals contain chrominance and luminance information. Chrominance is that portion of video that corresponds to color values and includes information about hue and saturation. Color video signals may be expressed in terms of a red component, a green component, and a blue component. Luminance is that portion of video corresponding to brightness value. In a black and white video signal, luminance is the grayscale brightness value of the black and white signal. In a color video signal, luminance can be converted into red, green and blue components, or can be approximated by a weighted average of the red, green and blue components. For example, in one well-known scheme, luminance is approximated by the equation: 0.30*red component+0.59*green component+0.11*blue component. For explanatory purposes, shaded regions of the Figures represent lower luminance values than blank (white) regions. For example, the white portion 121 in odd row SO(4) has a higher luminance value than the shaded portion of the same row.

To generate a progressive (i.e., non-interlaced) video display from an interlaced video signal, the video signal must be de-interlaced. Conventional de-interlace methodologies can be divided into two main categories—2D de-interlacing or 3D de-interlacing. In 2D de-interlacing, a frame is re-created from a single field via interpolation of the rows in that field. A common 2D de-interlacing technique involves duplicating each row of a single frame to provide pixel values for the blank rows; i.e., each blank row in an odd field could be filled with a copy of the odd row directly below that empty row, while each blank row in an even field could be filled with a copy of the even row directly above that empty row. 2D de-interlacing is particularly useful for scenes involving fast motion since even if a scene change occurs between consecutive fields, such changes would not affect (distort) a frame formed using "pure" common-field pixel interpolation (i.e., formed using only the pixels in a single field).

For example, FIG. 2A shows a sequence of views 210A, 210B, and 210C from which a video signal is to be generated. View 210A includes a white square 211A on a shaded background 212A, view 210B includes just a shaded background 212B, and view 210C includes a white square 211C on a shaded background 212C. Therefore, the sequence of views 210A–210C represent a scene in which a white square flashes on and off over a shaded background. If this flashing occurs at a rate greater than twice the frame rate of the final video signal, the interlace process could result in only a single field being generated for each state (on/off) of the white square. The corresponding sequence of fields could then look something like fields 220A, 220B, and 220C. Odd field 220A includes shaded odd rows SO(1)A–SO(8)A, with each of rows SO(4)A–SO(6)A including a white portion 221A corresponding to white square 211A in view 210A. Even field 220B includes even rows SE(1)B–SE(8)B, which are all fully shaded. And odd field 220C includes shaded odd rows SO(1)C–SO(8)C, with each of rows SO(4)C–SO(6)C including a white portion 221C corresponding to white square 211C in view 210C.

Using 2D de-interlacing, the rows in each of fields 220A, 220B, and 220C could then be "doubled up" to form frames 230A, 230B, and 230C, respectively, for the final video display. Specifically, each row of a field is repeated once to form a frame. Because of white portions 221A in rows SO(4)A–SO(6)A of field 220A, frame 230A includes a white square 231A formed on a shaded background 232A. Similarly, the white portions 221C in rows SO(4)C–SO(6)C in field 220C result in frame 230C having a white square 231C on a shaded background 232C. Meanwhile, since all of even rows SE(1)B–SE(8)B in field 220B are completely shaded, the row doubling of the 2D de-interlacing process results in frame 230B being a solid shaded square 232B. In this manner, the 2D de-interlacing process generates a series of frames that properly display the flashing white square on the shaded background present in the original scene.

However, note that 2D de-interlacing necessarily reduces the resolution of the final video display, since only half of the image data (i.e., a single field) is used to generate each frame. This not only results in less detail in the final video display, but also can introduce significant inaccuracies for certain image patterns. For example, FIG. 2B shows a sequence of views 210D, 210E, and 210F from which a video signal is to be generated. Each of views 210D–210F includes three white lines 213D on a shaded background 212D. Thus, views 210D–210F represent a still, or static, scene. However, the interlacing process could create fields in which white lines 213D are aligned with only odd (or only even) rows, in which case half of the interlaced fields would not include any information about the white lines. Thus, an alignment of white lines 213D with odd rows could result in a sequence of fields 220D, 220E, and 220F.

Odd field 220D includes shaded odd rows SO(1)D–SO(8)D, with each of rows SO(4)D–SO(6)D including a white portion 221D corresponding to a white line 213D in view 210D. Similarly, odd field 220F includes shaded odd rows SO(1)F–SO(8)F, with each of rows SO(4)F–SO(6)F including a white portion 221F corresponding to white lines 213D in view 210F. However, even field 220E only includes fully shaded even rows SE(1)E–SE(8)E. Therefore, the interlaced sequence of fields 220D–220F is identical to the interlaced sequence of fields 220A–220C shown in FIG. 2A, even though the original scenes are completely different. As a result, a subsequent 2D de-interlacing operation on fields 220D–220F will generate the same output frames as the de-interlacing operation described with respect to FIG. 2A. Specifically, the 2D de-interlacing process will generate frames 230D, 230E, and 230F, in which frames 230D and 230F include white squares 231D and 231F, respectively, on shaded backgrounds 232D and 232F, respectively, and frame 230E simply includes a solid shaded background 232E. Thus, the progressive video display created by frames 230D–230F would show a flashing white square on a shaded background, rather than the desired static scene of three white lines.

3D de-interlacing addresses this sort of resolution-related problem by merging successive fields into a single frame for the final video display. For example, in FIG. 2B, odd field 220D could be merged with even field 220E to form a single frame that correctly displays the three white lines on a shaded background. Odd field 220F could then be merged with the next even field (not shown for clarity, but similar to even field 220E) to form another frame having three white lines on a shaded background. Thus, each frame in the resulting video signal would include the three white lines and the static nature of the original scene would be retained in the final video display. In this manner, 3D de-interlacing enables accurate video display of high-resolution static scenes.

Note, however, that the 3D de-interlacing methodology would lead to problems in a situation as described with respect to FIG. 2A, in which the rapid motion within a scene leads to view changes between successive fields. For example, if a 3D methodology were used to merge fields 220A and 220B of FIG. 2A, the resulting frame would depict three white lines (formed by white portions 221A in field 220A) on a shaded background, rather than the original white square on a shaded background. Furthermore, these three lines would remain static on the shaded background, since each odd frame (e.g., frames 220A and 220C) would include three white regions (e.g., portions 221A and 221C, respectively), which each even frame (e.g., frame 220B) would include only fully shaded rows. 3D de-interlacing would therefore result in an unchanging video display of three lines on a shaded background, rather than the flashing white square in the original scene.

Thus, because the interlacing process can generate the same sequence of fields from different original scenes, conventional 2D or 3D de-interlacing techniques will necessarily include one or the other of the display problems described above. Accordingly, it is desirable to provide a de-interlace system and method that provide accurate video display of interlaced video signals.

SUMMARY

The invention generates frames from interlaced video signals by incorporating cross-field data into an interpolation-based de-interlacing process. A conventional 2D de-interlacing process (i.e., "pure" 2D, using only common-field pixels) is performed to interpolate missing pixels associated with moving portions of the final frame, and a mixed 2D-3D de-interlacing process is performed to interpolate missing pixels associated with still portions of the final frame.

According to an embodiment of the invention, a mixed 2D-3D de-interlacing operation involves selecting a "boundary pixel grouping" of original field pixels that surround a blank pixel. The boundary pixel grouping includes at least one original pixel from the field of the blank pixel and at least one pixel from a field other than the field of the blank pixel. According to an embodiment of the invention, a boundary pixel grouping is formed by a common-field pixel pair and a cross-field pixel pair of pixels. The common-field pixel pair consists of the pixels directly above and below the blank pixel location in the field containing the blank pixel location. The cross-field pixel pair consists of the pixels immediately before and after the blank pixel location in the fields immediately preceding and following, respectively, the field containing the blank pixel location.

To determine a luminance value for the blank pixel location, a weighted average is performed using pixel values from both the common-field and cross-field pixel pairs. The use of cross-field pixels by the invention increases the effective resolution of the interpolation algorithm, thereby enhancing the accuracy of the final output frame and avoiding the problems associated with conventional 2D de-interlacing techniques that only use common-field data. The actual weighting of the interpolation process is set by a predetermined weighting coefficient that controls the degree to which the cross-field pixel information is incorporated into the interpolation.

To provide maximum visual accuracy in the final video display, the mixed 2D-3D de-interlacing operation can also adjust the luminance values of pixels adjacent to the interpolated pixel. For example, according to an embodiment of the invention, the luminance of the top pixel in the common-field pixel pair can be adjusted towards the luminance value of its preceding pixel (i.e., the interpolated pixel in the same location as the top pixel but from the field immediately preceding the field of the top pixel). By adjusting the top pixel luminance in this manner, frame-to-frame variations can be further reduced to enhance the fidelity of the output video display.

The present invention will be more fully understood in view of the following description and drawings.

DETAILED DESCRIPTION

The invention provides a mixed 2D-3D de-interlacing methodology that allows interpolation to be used to generate an accurate video display from an interlaced video stream. Each field in the interlaced video stream is converted into a full frame by interpolating pixel data for each blank row in the field using both common-field pixel data (i.e., pixel data from the same field as the field being converted) and cross-field pixel data (i.e., pixel data from fields other than the field being converted). This "mixed" interpolation algorithm minimizes the resolution-based defects associated with conventional 2D de-interlacing of still images.

Figure 3A:
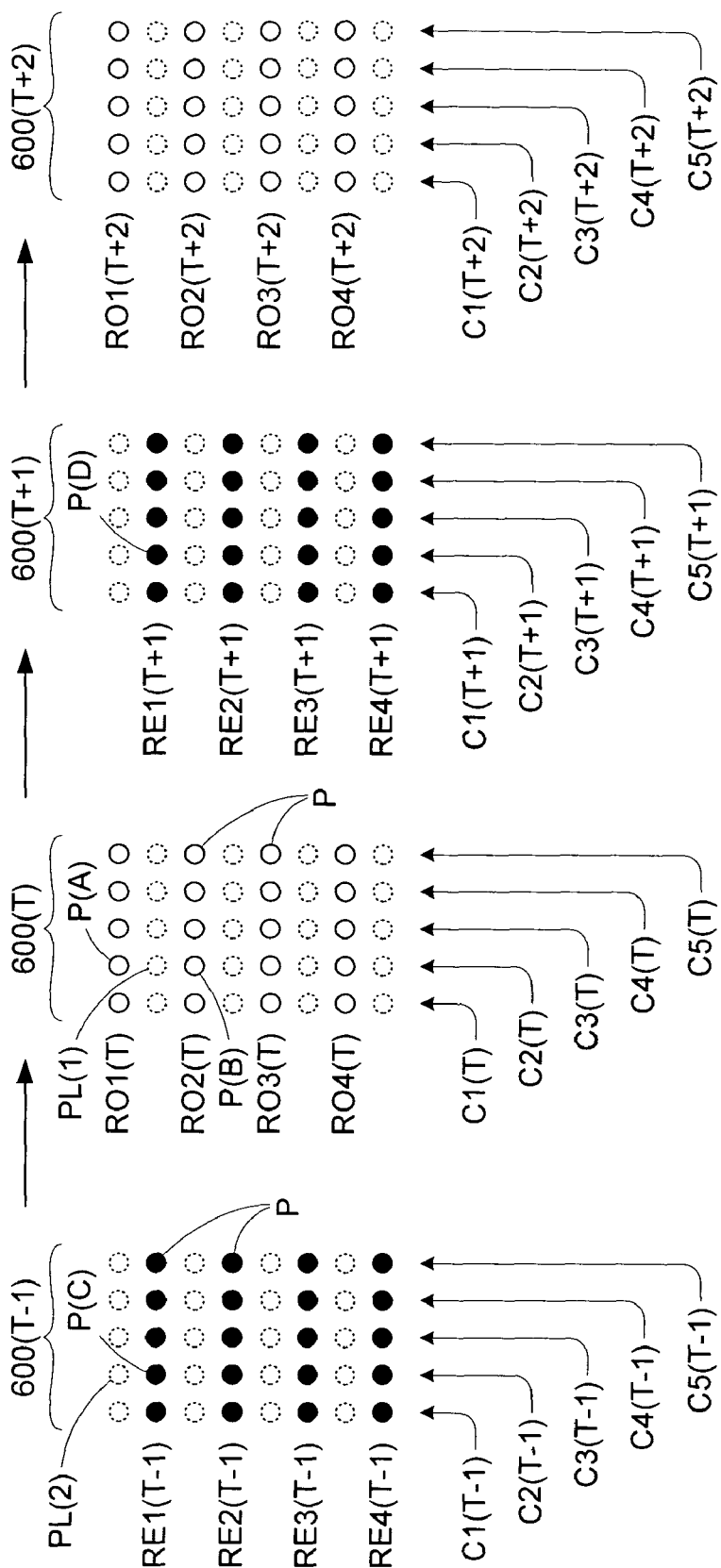
FIG. 3A is a series of fields from an interlaced video signal with labeled pixels for a mixed 2D-3D de-interlacing operation in accordance with an embodiment of the invention.

FIG. 3A shows four consecutive fields 600(T−1), 600(T), 600(T+1), and 600(T+2) of an interlaced video signal. Each of the fields includes twenty pixels P, arranged into five columns C1, C2, C3, C4, and C5 and four rows. Even fields 600(T−1) and 600(T+1) include even rows RE1, RE2, RE3, and RE4, while odd fields 600(T) and 600(T+2) include odd rows RO1, RO2, RO3, and RO4. The blank pixel locations requiring interpolation in the blank rows of fields 600(T−1), 600(T), 600(T+1), and 600(T+2) are shown with dotted outlines. For explanatory purposes, all the pixels in even fields 600(T−1) and 600(T+1) are black pixels, while all the pixels in odd fields 600(T) and 600(T+2) are white pixels. Thus, fields 600(T−1), 600(T), 600(T+1), and 600(T+2) can represent a view of a static pattern of alternating black and white lines, or can represent a view of flashing black and white backgrounds.

To interpolate pixel values for the blank pixel locations in the blank rows of fields 600(T−1), 600(T), 600(T+1), and 600(T+2), a "boundary pixel grouping" can be selected that includes both common-field and cross-field original pixels. For example, according to an embodiment of the invention, a boundary pixel location can include a common-field pixel pair and a cross-field pixel pair. The common-field pixel pair for a blank pixel location in a selected field consists of the original pixels in the selected field that are directly above and below the pixel location. The cross-field pixel pair for that same blank pixel location consists of the original pixels having the same location in the fields directly preceding and directly following the selected field. The boundary pixel grouping formed by the common-field pixel pair and the cross-field pixel pair surrounding a particular blank pixel can then be used to interpolate a pixel value for that blank pixel location.

For example, for a blank pixel location PL(1) in field 600(T), the common-field pixel pair would consist of original pixels P(A) and P(B) in field 600(T), while the cross-field pixel pair would consist of original pixels P(C) and P(D) in fields 600(T−1) and 600(T+1), respectively. Pixel P(A) is referred to as the "top pixel" since is positioned above blank pixel location PL(1), while pixel P(B) is referred to as the "bottom pixel" since it is positioned below blank pixel location PL(1). Meanwhile, pixel P(C) is referred to as the "leading pixel" since it is in the field (600(T−1)) that precedes the field (600(T)) having blank pixel location PL(1). Pixel P(D) is referred to as the "trailing pixel" since it is in the field (600(T+1)) that follows the field having blank pixel location PL(1).

Figure 3B:
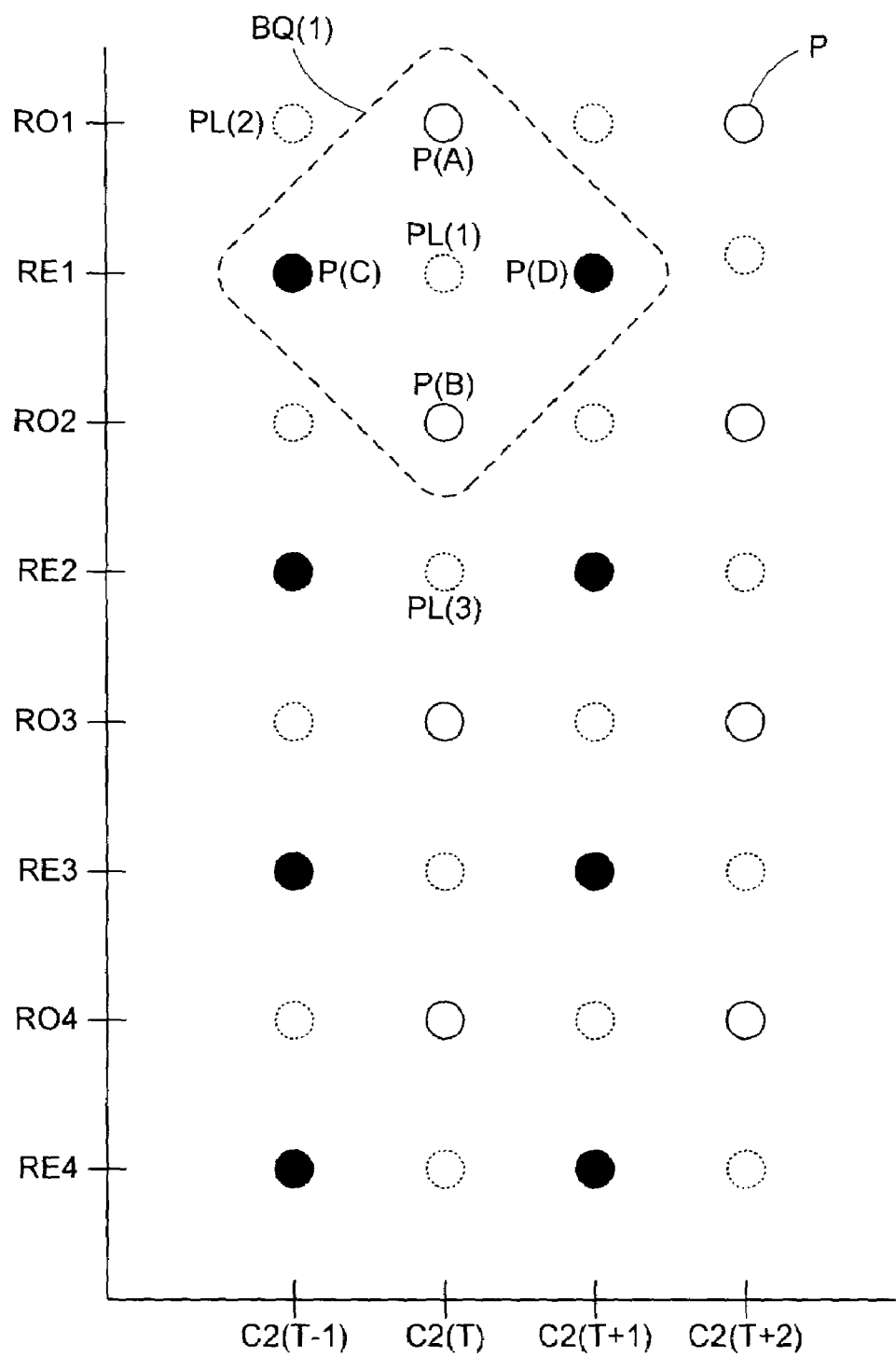
FIG. 3B is a graph of the pixel progression for a selected column in each of the fields in FIG. 3A.

FIG. 3B shows a graph of the pixel progression of column C2 for each of fields 600(T−1), 600(T), 600(T+1), and 600(T+2). FIG. 3B clearly depicts how the common field pixel pair made up of pixels P(A) and P(B) and the cross-field pixel pair made up of pixels P(C) and P(D) form a boundary pixel grouping BQ(1) that surrounds blank pixel location PL(1).

According to an embodiment of the invention, the interpolation algorithm for assigning a luminance value to blank pixel location PL(1) depends on the pixel state (i.e., whether or not the image is moving or still) at that location. If blank pixel location PL(1) represents a moving pixel state, then the luminance value assigned to blank pixel location PL(1) is determined using only common-field pixels using standard 2D de-interlacing techniques. If blank pixel location PL(1) represents a still pixel state, then the luminance value for blank pixel location PL(1) is determined using a mixed 2D-3D de-interlacing technique that performs an interpolation that uses the luminance values of the pixels in the boundary pixel grouping. In this manner, the invention generates an output video signal that provides an acceptable representation of the original scene data for both moving and still images. In contrast, conventional "pure" 2D or 3D interpolation techniques will produce either a completely correct or completely incorrect output video signal (as described above), depending on whether the image is moving or still.

Note that the determination of the pixel state can be performed at any time prior to the actual interpolation process. For example, prior to the de-interlacing operation, a noise reduction operation can be performed, such as described in co-owned and co-pending U.S. Pat. application Ser. No. 09/885,420 herein incorporated by reference. The noise reduction operation assigns a state bit to each pixel in a field to indicate the pixel state. Thus, during the subsequent de-interlacing operation, the state bits associated with the boundary pixel grouping pixels can be used to determine a pixel state for the blank pixel location. For example, the state bit associated with trailing pixel P(D) could be used to provide the pixel state for blank pixel location PL(1).

According to an embodiment of the invention, the 2D-3D de-interlacing calculates a weighted average using the common-field pixel pair luminance and the cross-field pixel pair luminance to generate a luminance value for the blank pixel location. For example, the interpolated luminance value Y(1) for blank pixel location PL(1) could be calculated as follows:

$$Y(1) = COE \cdot Y(B) + (1 - COE) \cdot Ycross \quad (1)$$

where Y(B) is the luminance value of pixel P(B), COE (described in detail below) is a weighting coefficient between 0 and 0.5, and Ycross is a cross-field luminance value based on the cross-field pixel pair formed by pixels P(C) and P(D). According to an embodiment of the invention, cross-field luminance value Ycross can be given by:

$$Ycross = (Y(C) + Y(D))/2 \quad (2)$$

where Y(C) and Y(D) are the luminance values of pixels P(C) and P(D), respectively. However, since Y(C) and Y(D) are typically very similar for still images, according to other embodiments of the invention, cross-field luminance value Ycross can also be replaced with either luminance Y(C) or Y(D) alone.

Note that the common-field pixel data is multiplied by weighting coefficient COE directly while the cross-field pixel data is multiplied by its complement (i.e., one minus COE). Therefore, the value of weighting coefficient COE determines the relative effects of the common-field and cross-field luminance values.

In addition to assigning the interpolated luminance value Y(1) to blank pixel location PL(1), when top pixel P(A) has a still pixel state, the mixed 2D-3D de-interlacing operation can also adjust the luminance value of top pixel P(A) to maximize still image fidelity. When pixel P(A) has a still pixel state, its luminance value should match the luminance value assigned to the blank pixel location immediately preceding pixel P(A) (i.e., blank pixel location PL(2)) to eliminate any flashing effects between the frames formed from columns C2(T−1) and C2(T). Therefore, rather than simply outputting pixel P(A) directly, the 2D-3D de-interlacing operation redefines the luminance of pixel P(A) by performing a weighted average with the cross-field pixel pair luminance as follows:

$$Y'(A)=(1-COE)*Y(A)+COE*Ycross \quad (3)$$

where Y' (A) is the adjusted luminance of pixel P(A), Y(A) is the original luminance of pixel P(A), and Ycross is any of the cross-field luminance values described above. Note that the formulation of Ycross in Equation 3 need not match the formulation of Ycross used in Equation 1.

Figure 3C:
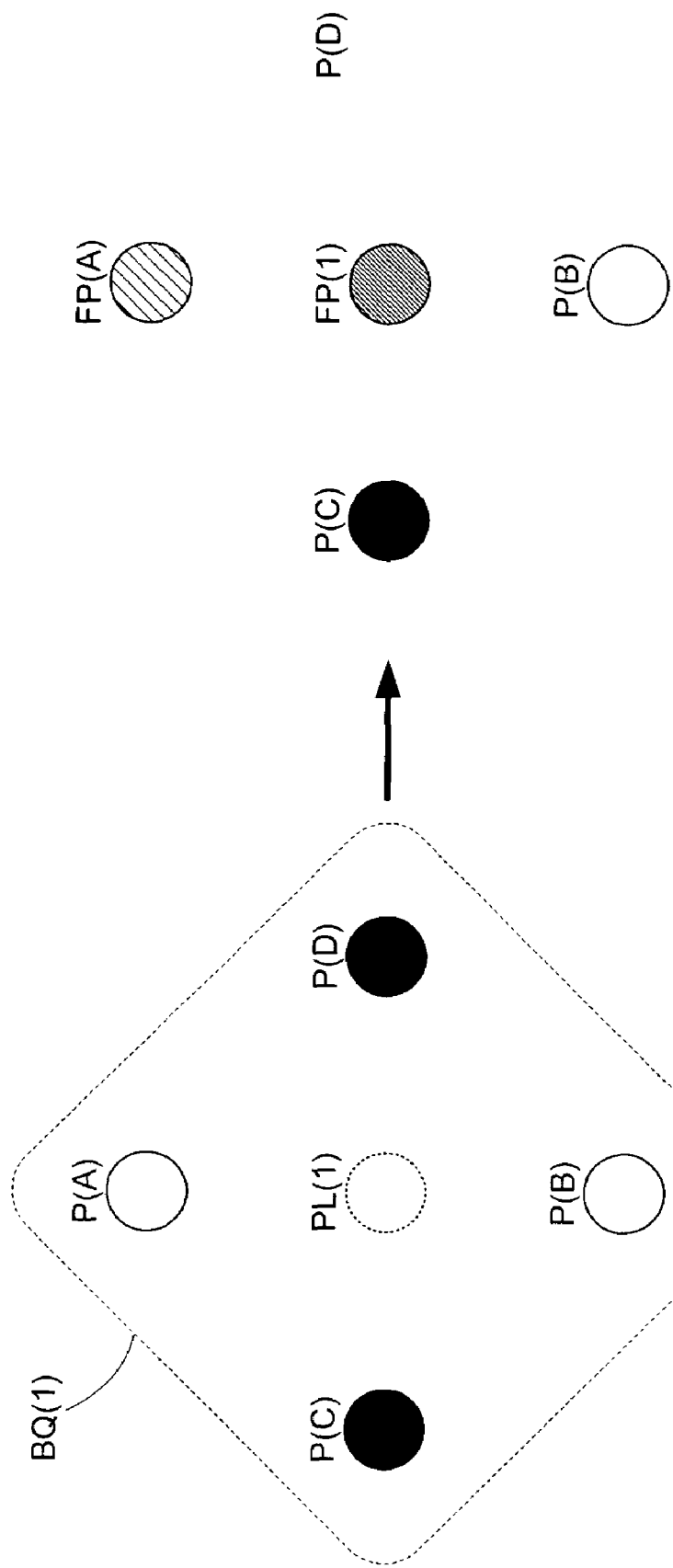
FIG. 3C is a diagram of the results of a mixed 2D-3D de-interlacing operation on selected pixels from FIG. 3B.

The net result of mixed 2D-3D de-interlacing at blank pixel location PL(1) is depicted in FIG. 3C, which shows a detail view of boundary pixel grouping BQ(1) from FIG. 3B, and the corresponding final pixels produced by the de-interlacing process. Blank pixel location PL(1) is filled with a final pixel FP(1), and original top pixel P(A) is converted to a final pixel FP(A). Interpolated final pixel FP(1) is darkly shaded, corresponding to the black original pixels P(C) and P(D). Final pixel FP(1) is not completely black due to the weighted averaging used in the de-interlacing process (described in Equation 1). Final pixel FP(A) is lightly shaded, representative of the weighted average adjustment of Equation 3. Note that the final luminance for pixel P(B) would be determined during the processing of the blank pixel location directly below pixel P(B) (i.e., blank pixel location PL(3) shown in FIG. 3B).

Figure 1:
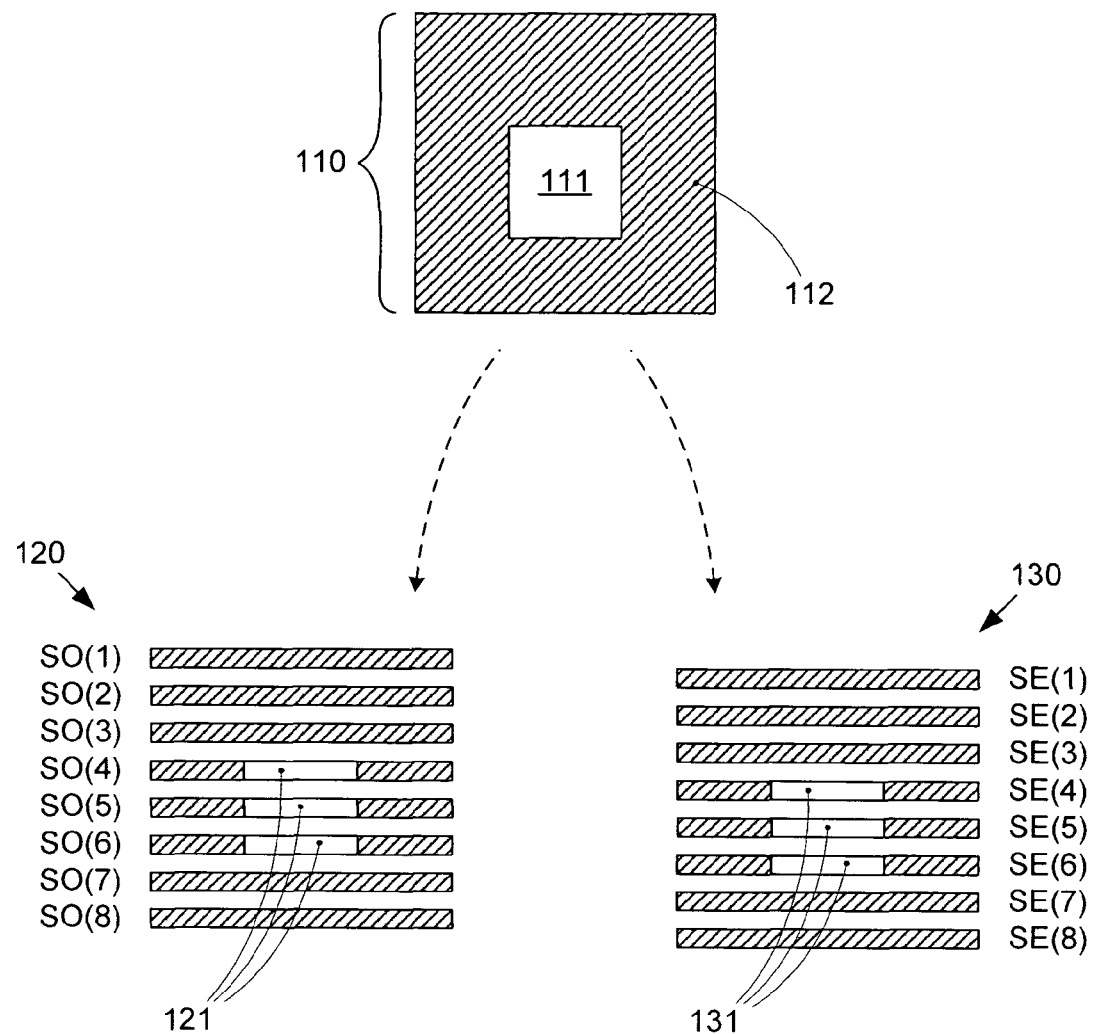
FIG. 1 is a diagram of the formation of an interlaced video signal.
Figure 2A:
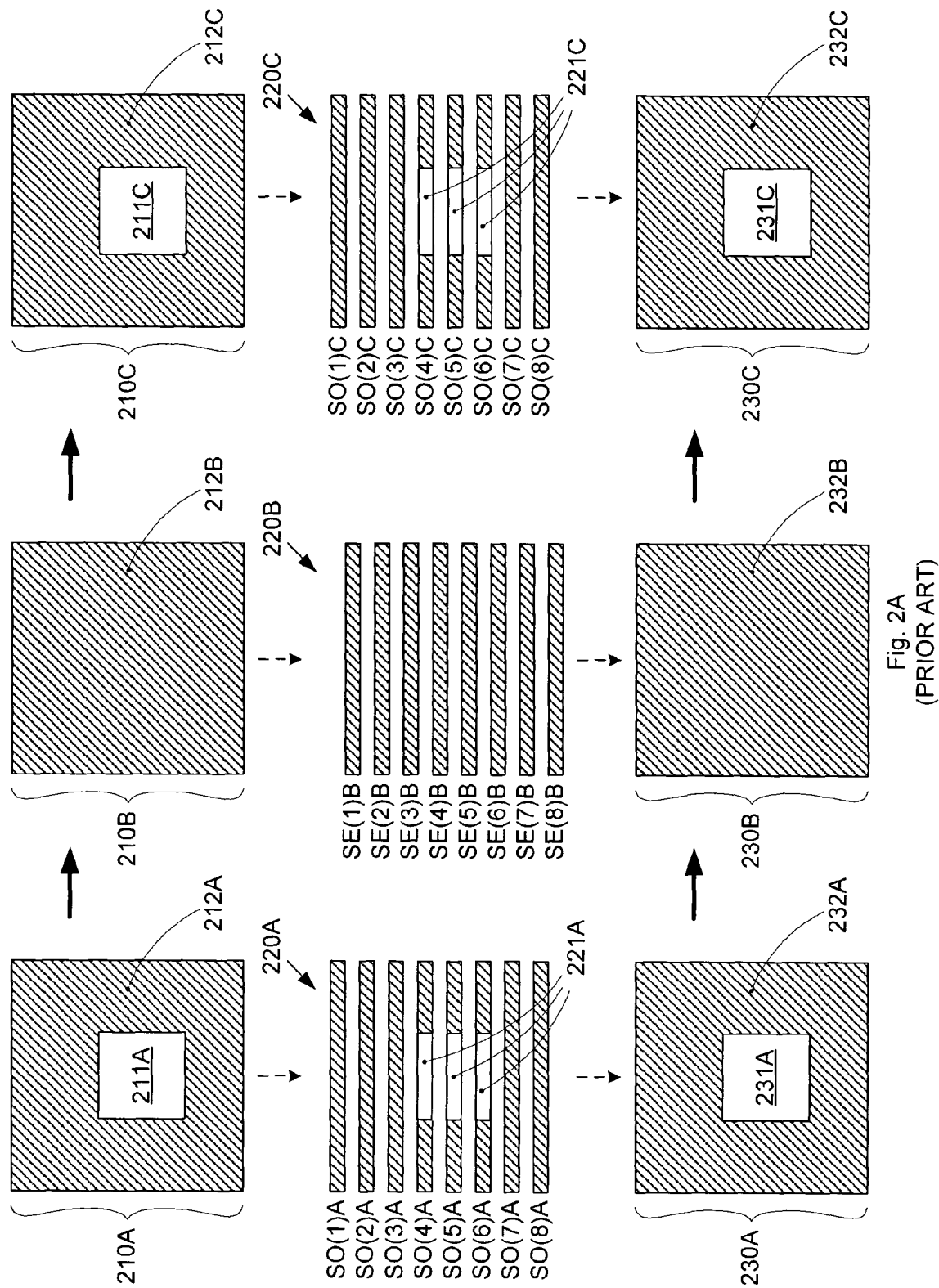
FIG. 2A is a diagram of a conventional 2D de-interlacing operation applied to an interlaced video signal for a moving image.
Figure 2B:
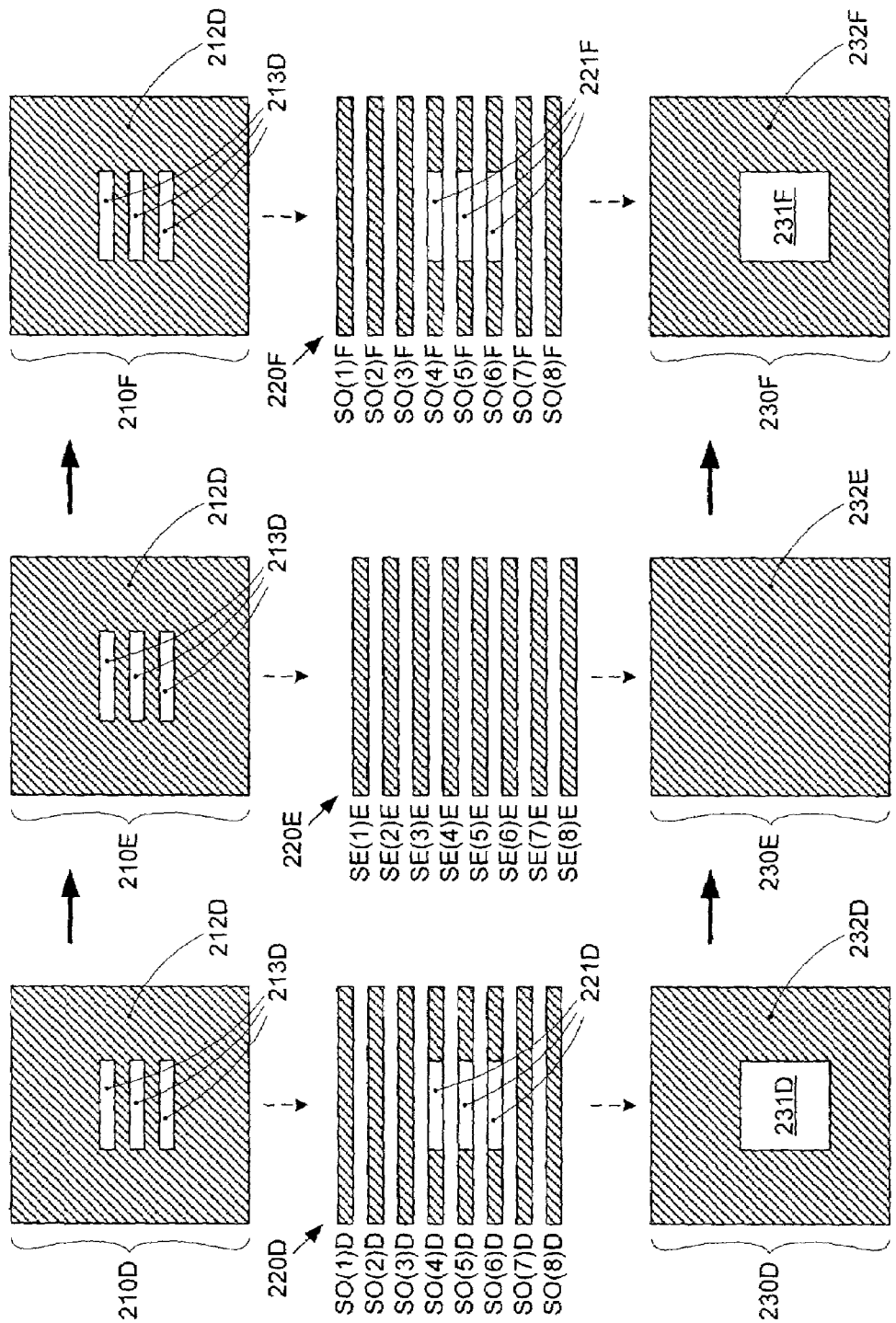
FIG. 2B is a diagram of a conventional 2D de-interlacing operation applied to an interlaced video signal for a still image.
Figure 3D:
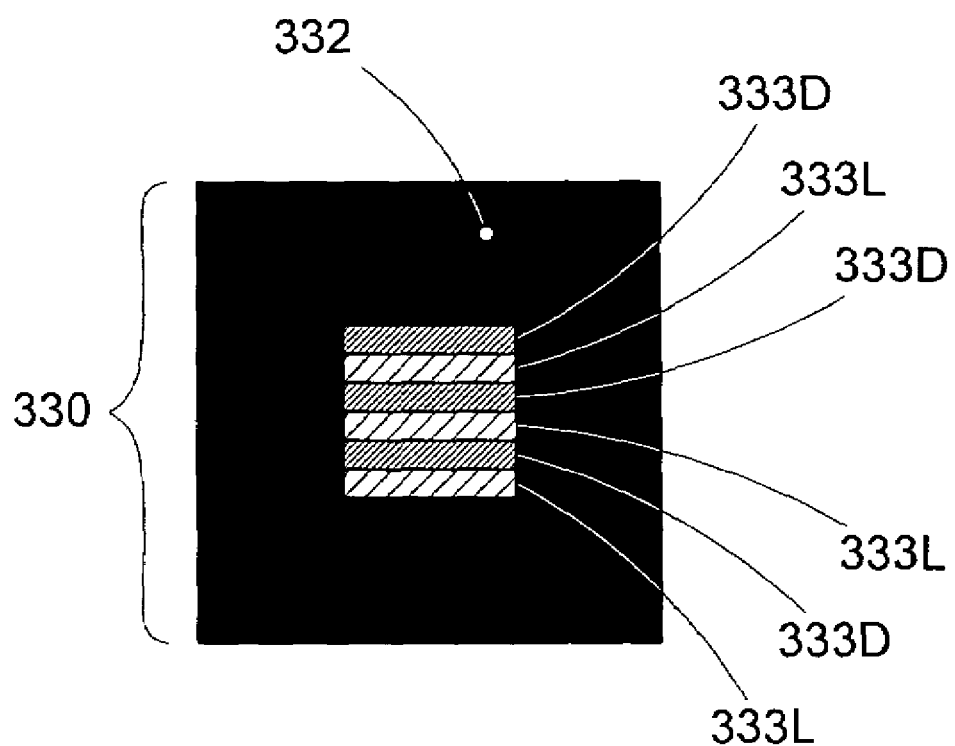
FIG. 3D is a diagram of a frame produced by a mixed 2D-3D de-interlacing operation in accordance with an embodiment of the present invention.

FIG. 3D shows an example frame 330 that could be generated by applying the 2D-3D de-interlacing operation to a sequence of fields such as fields 220D–220F shown in FIG. 2B. Frame 330 includes an alternating series of dark lines 333D and lighter lines 333L on a dark background 332 (note that for illustrative purposes, background 332 is depicted as solid black to instead of the shaded background shown in FIGS. 2A and 2B, to allow the difference in shading between lines 333D and 333L to be more readily visible). Frame 330 therefore retains the "multiple-line" characteristics of views 210D–210F shown in FIG. 2B, despite using an interpolation-based approach.

As indicated in FIG. 3C and 3D, and by Equations 1 and 3, the mixed 2D-3D de-interlacing operation balances the contrast of the final output video display with the resolution of that display. This balance is controlled by weighting coefficient COE. For example, using the relative luminance representations shown in FIG. 3C, to maintain image fidelity, final pixel FP(1) should be darker than final pixel FP(A). Therefore, the luminance of final pixel FP(1) should be less than the luminance of final pixel FP(A). Assuming that original pixels P(C) and P(D) have a luminance Ylo and original pixels P(A) and P(B) have a luminance Yhi (Yhi>Ylo), then the luminance of final pixel FP(1) is given by:

$$Y(1)=COE*Yhi+(1-COE)*Ylo \quad (4)$$

and the luminance of final pixel FP(A) is given by:

$$Y(A)=(1-COE)*Yhi+COE*Ylo \quad (5)$$

The difference between the luminance of final pixel FP(A) and the luminance of final pixel FP(1) should be positive, so that:

$$(1-COE)*Yhi+COE*Ylo>COE*Yhi+(1-COE)*Ylo \quad (6)$$

Equation 6 resolves as follows:

$$Yhi - COE*Yhi + COE*Ylo > COE*Yhi + Ylo - COE*Ylo \quad (7)$$
$$Yhi - COE*(Yhi - Ylo) > Ylo + COE*(Yhi - Ylo)$$
$$Yhi - Ylo > 2COE*(Yhi - Ylo)$$
$$1/2 > COE$$

Thus, as noted above, weighting coefficient must be less than 0.5 to properly weight the mixed 2D-3D de-interlacing Equations 1 and 3.

Figure 4:
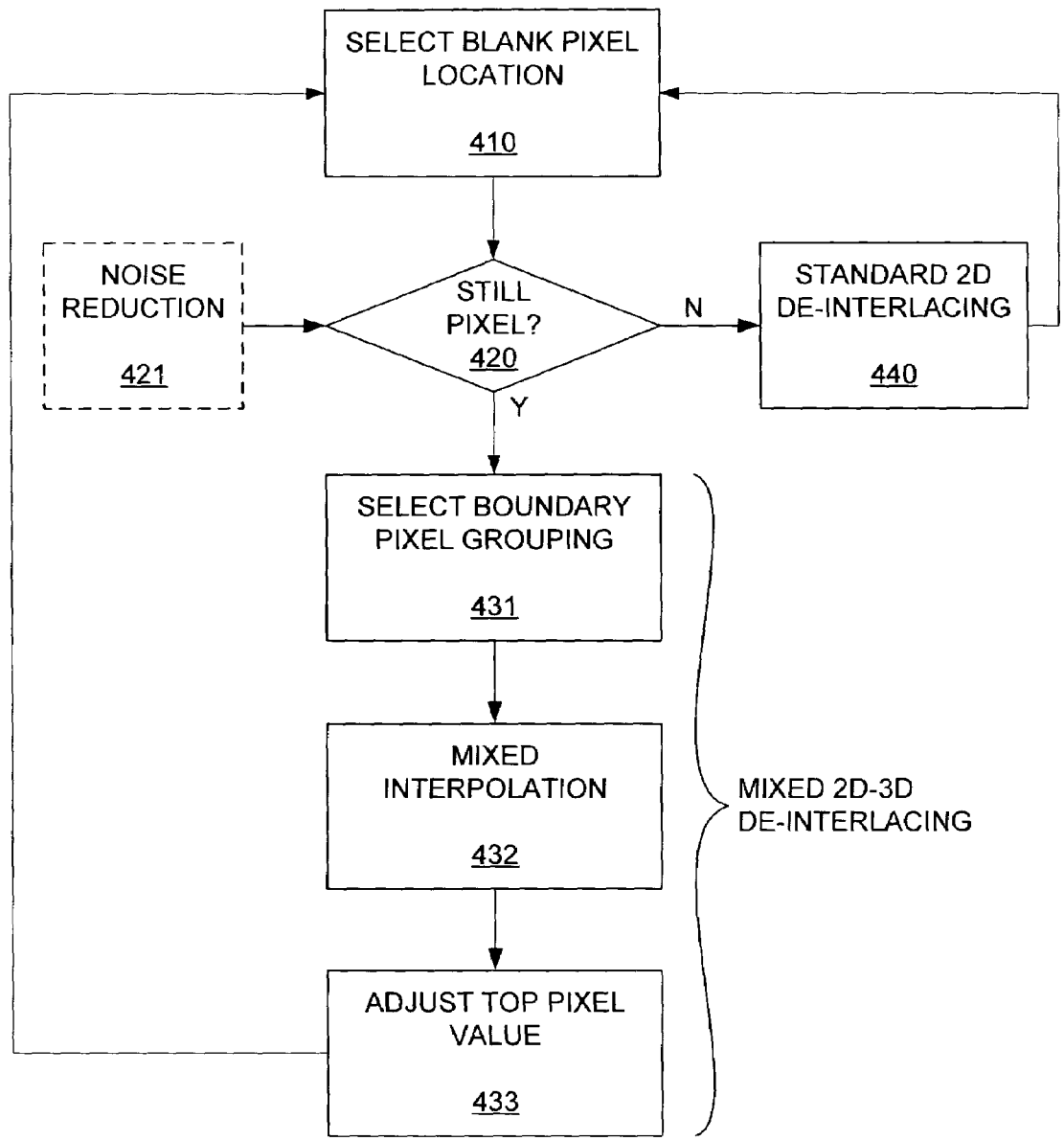
FIG. 4 is a flow chart of a mixed 2D-3D de-interlacing methodology according to an embodiment of the invention.

FIG. 4 is a flow diagram of the above-described mixed 2D-3D de-interlacing algorithm according to an embodiment of the invention. In a "SELECT BLANK PIXEL LOCATION" step 410, a blank pixel location in a video field is selected for interpolation. The pixel state for the blank pixel location is then determined in a "STILL PIXEL?" step 420 (using, for example, pixel state information from an optional noise reduction step 421). If the blank pixel location is associated with a moving portion of the image (i.e., is not still), then an interpolated value is assigned to the blank pixel location using any conventional (pure) 2D de-interlacing technique in a "STANDARD 2D DE-INTERLACING" step 440. The process then loops back to step 410 where a new blank pixel location can be selected.

However, if a still pixel state is detected in step 420, a mixed 2D-3D de-interlacing operation is performed. First, a boundary pixel grouping surrounding the blank pixel location is selected in a "SELECT BOUNDARY PIXEL GROUPING" step 431. Then, in a "MIXED INTERPOLATION" step 432, a luminance value for the blank pixel location is generated using the boundary pixel grouping values as described by Equation 1. The luminance value of the top pixel in the boundary pixel grouping is adjusted by Equation 3 to further enhance the output video fidelity in an "ADJUST TOP PIXEL VALUE" step 433. The process then loops back to step 410 where a new blank pixel location can be selected.

Various embodiments of the invention have been described for de-interlacing an interlaced video using common-field and cross-field pixels to minimize display inaccuracies. The various embodiments of the invention that are described above are illustrative only of the principles of this invention and are not intended to limit the scope of the invention to the particular embodiments described. Thus, the invention is limited only by the following claims and their equivalents.

What is claimed is:

1. A method for interpolating a pixel value for a blank pixel location in a field from an interlaced video stream, the method comprising:
   selecting a boundary pixel grouping comprising common-field pixel pair comprising a common-field pixel and a cross-field pixel pair comprising a cross-field pixel, wherein both the commonfield pixel pair and the cross-field pixel pair surround the blank pixel location;
   generating a weighted average from the boundary pixel grouping by:
      multiplying a luminance of a bottom pixel in the common-field pixel pair by a weighting coefficient to generate a first interpolated portion;
      multiplying a first cross-field luminance value by a complement of the weighting coefficient to generate a second interpolated portion, wherein the first cross-field luminance value is based on a luminance value of the cross-field pixel; and
      adding the first interpolated portion to the second interpolated portion to generate the weighted average; and
   assigning the weighted average to the blank pixel location.

2. The method of claim 1, wherein the first cross-field luminance value is equal to the luminance value of the cross-field pixel, and wherein the cross-field pixel comprises a leading pixel in the cross-field pixel pair.

3. The method of claim 1, wherein the first cross-field luminance value is equal to the luminance value of the cross-field pixel, and wherein the cross-field pixel comprises a trailing pixel in the cross-field pixel pair.

4. The method of claim 1, wherein the cross-field pixel comprises a leading pixel in the cross-field pixel pair, wherein the cross-field pixel pair further comprises a trailing pixel, and wherein the first cross-field luminance value is equal to an average of the luminance value of the cross-field pixel and a luminance value of the trailing pixel.

5. The method of claim 1, wherein the weighting coefficient is between 0 and 0.5.

6. The method of claim 1, further comprising:
   multiplying a luminance of a top pixel in the common-field pixel pair by the complement of the weighting coefficient to generate a first adjustment portion;
   multiplying a second cross-field luminance value by the weighting coefficient to generate a second adjustment portion, wherein the second cross-field luminance value is based on a luminance value of the cross-field pixel;
   adding the first adjustment portion to the second adjustment portion to generate a modified luminance value; and
   replacing the luminance of the top pixel with the modified luminance value.

7. The method of claim 6, wherein the second cross-field luminance value is equal to the luminance value of the cross-field pixel, and wherein the cross-field pixel comprises a leading pixel in the cross-field pixel pair.

8. The method of claim 6, wherein the second cross-field luminance value is equal to the luminance value of the cross-field pixel, and wherein the cross-field pixel comprises a trailing pixel in the cross-field pixel pair.

9. The method of claim 6, wherein the cross-field pixel comprises a leading pixel in the cross-field pixel pair, wherein the cross-field pixel pair further comprises a trailing pixel, and wherein the second cross-field luminance value is equal to an average of the luminance value of the cross-field pixel and a luminance value of the trailing pixel.

* * * * *